April 7, 1970   M. G. FLEMING ET AL   3,505,519
PARTICLE SIZE ANALYSIS
Filed April 12, 1966   2 Sheets-Sheet 1
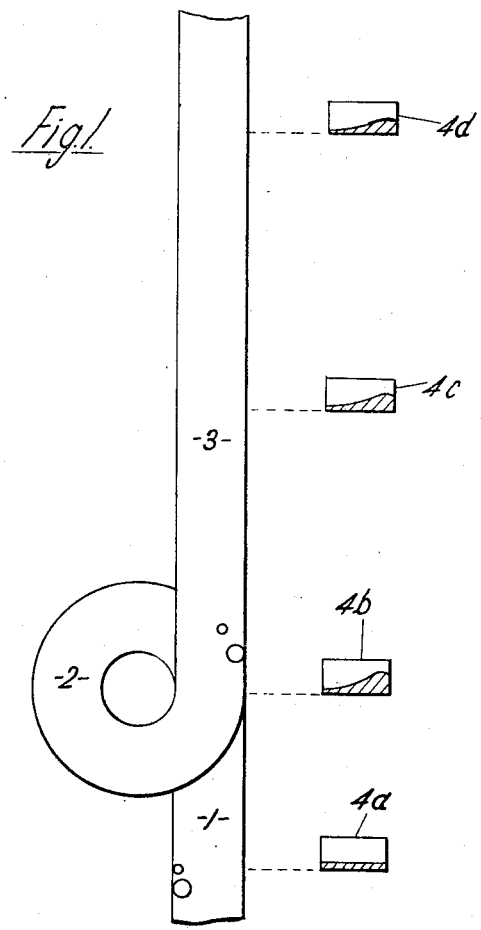

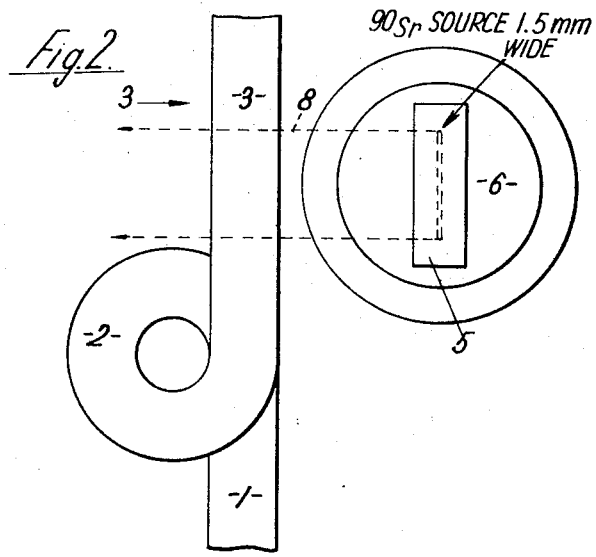
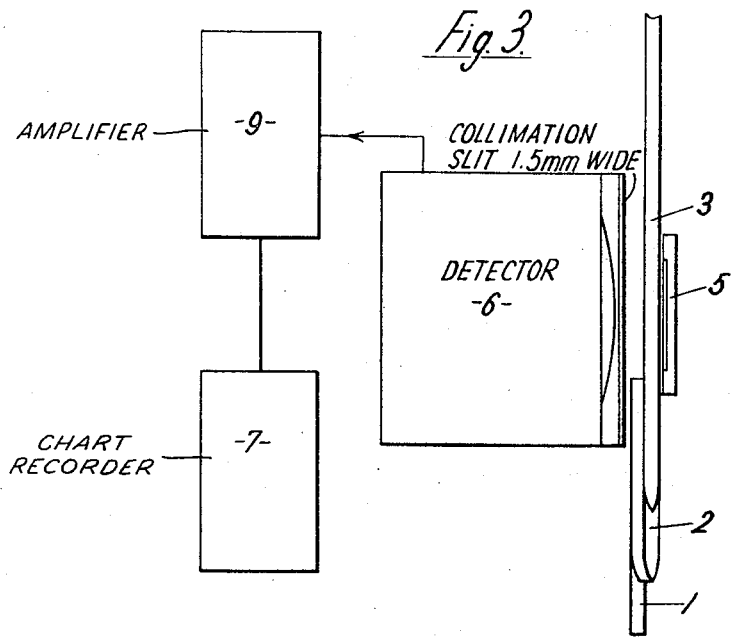

United States Patent Office 3,505,519
Patented Apr. 7, 1970

3,505,519
PARTICLE SIZE ANALYSIS
Marston Greig Fleming, Kew, and Anthony Bertram Holland-Batt, Normandy, England, assignors to National Research Development Corporation, London, England
Filed Apr. 12, 1966, Ser. No. 542,146
Claims priority, application Great Britain, Apr. 15, 1965, 16,376/65
Int. Cl. G01n 23/12, 21/26; G21f 5/02
U.S. Cl. 250—43.5
8 Claims

ABSTRACT OF THE DISCLOSURE

This invention solves the problem of measuring particle size distribution in a continously flowing suspension. The technique employed is to pass the flowing stream through a region where a force field is applied transverse to the direction of flow to create temporarily a stratification or specific concentration profile in respect of the particles across the channel in which the stream flows. Measurements are then taken immediately down stream of this region, that is to say before the stratification effect so created has disappeared due to remixing in the flowing stream. A convenient way of applying the force field is to turn the stream through a helical bend in the flow channel. And measurements immediately down-stream of this bend can be performed by passing radiation beams transversely through the suspension to impinge on photoelectric detector means. The foregoing abstract is not intended to define the scope of the invention and is only provided to permit a cursory review of the gist of the invention.

This invention is concerned with the determination of particle side distribution occurring in suspensions of solid particles in fluid media.

When such a suspension is subjected to an appropriate force field, particles of differing sizes or masses achieve differing terminal velocities in the direction of the applied field.

According to one aspect of the invention, there is provided a method of on-stream measurement of particle size distribution in a suspension, using the effect of an applied force field to create a specific concentration profile across a channel in which the stream flows.

According to another aspect, a method of on-stream measurement of particle size distribution, for particles the bulk of which are of substantially similar shape and uniform density and suspended in a fluid stream, comprises the steps of applying to the fluid stream containing the particles, while it is flowing in an enclosed channel, a force field in a direction substantially at right angles to the direction of flow to create a specific concentration or particle stratification profile across the flow channel, and measuring the varying concentration of the particles across the flow channel at a region downstream of the region where the force field is applied but before the particle stratification effect is lost due to remixing.

Preferably, the force field is created by causing the stream to flow in a path of changing direction thereby imparting to it an angular velocity.

When the force field is applied at right angles to the direction of motion of a suspension flowing in an enclosed channel, the resulting concentration of particles across the channel in the direction of the force field, as a function of position in the channel, is influenced by the size distribution of the solid particles. When the particles are of similar shape and density the concentration will be directly dependent on their size distribution. The concentration function can be measured by radiation absorbtion techniques, using a narrow beam of radiation applied at right angles to the direction of motion of the suspension and to the force field. The absorption of the radiation is measured at different positions across the channel, either continuously or discontinuously, to produce an output dependent on the concentration of solid particles at the measuring position. This output can then be used as desired to give an indication of particle size distribution which will be more or less accurate according to the uniformity of density and shape of the particles comprising the suspension.

The invention also provides apparatus for on-stream measurement of particle size distribution in a suspension, comprising a flow channel for the suspension, means at one region of the flow channel for locally imparting to the suspended particles in the stream therein a force field in a direction transverse to the principal direction of flow to create a specific concentration or stratification profile across the flow channel, and detector means downstream of said region, at a station where the stratification effect in the suspension stream is still maintained, to determine the concentration distribution of the particles across the flow channel in the general plane of application of the force field.

A particular way of carrying the invention into practice will now be described by way of example and with reference to the accompanying diagrammatic drawings, in which:

FIGURE 1 is a plan of a flow tube employ in the practice of the invention, together with section diagrams of flow distribution at various positions along the tube, FIGURE 2 is a view similar to FIGURE 1 but showing, instead of the section diagrams, means for scanning a region of the tube to detect the distribution therein, and FIGURE 3 is a view in the direction of the arrow 3 of FIGURE 2.

The suspension, in this case solid particles in a liquid medium, flows through a tube 1 of rectangular cross section which is bent round through one turn of a helix at a region 2 of its length; following the helix 2 the tube has a straight section 3. Initially, the solid particles are substantially evenly distributed across the flow channel, as indicated in the section diagram 4. Under the action of the force field generated by the rotational flow in the helix, the concentration distribution of the solid particles across the tube changes in the manner indicated in the section diagram 4a. Loss of stratification subsequently ensues as in section diagrams 4b and 4c.

This concentration distribution is measured using a narrow collimated beam of radiation emitted from a source 5 (FIGURES 2 and 3) toward an electrical detector 6, the source and detector being disposed on opposite sides of the tube and being traversed across the straight section 3 of the tube, along the scan path 8 at right angles to both the longitudinal axis of the flow channel and the direction of elongation of the beam cross section, and in the direction of change of concentration of the solid particles, by a traverse mechanism (not shown).

The electrical output signal of the detector 6 is, in this case, amplified in an amplifier 9 and recorded on a chart recorder 7 as a function of position across the flow tube.

The size distribution of the solid particles is related to the characteristics of the concentration profile. Using a suspension of quartz sand (quarried and broken) in water, with particles ½ mm. and smaller in size, the relation.

$$\Delta S = A \log N(K-C) + B$$

has been empirically established.

Where:

ΔS = Difference between maximum and minimum detector outputs
N = Slope of Gaudin-Gates-Schuhmann distribution plot
K = Size Modulus of this plot
A, B, C are constants for a given instrument and material.

With this relationship, which is considered valid for size distribution of material containing not more than 30% by weight coarser than 300 microns and not less than 20% by weight coarser than 76 microns, the results of the measurements with the apparatus described establish one point on the size distribution plot for the solids in suspension. For a particular operation it is normally found that the slope N defined as above remains sensibly constant, and the measurements will therefore complete the information necessary to effectively define the size distribution in these terms. Where closer definition is desirable subsidiary readings may provide further points on the curve.

Modifications of the arrangement described may be made without departing from the scope of the invention. Thus, for certain fine powders, more than one turn of a helix may be needed to create an adequate concentration profile. Also, it is possible to employ a number of fixed narrow radiation beams, instead of a scanning beam.

While the above description deals with the case in which the force field is produced by flow rotation the invention is not restricted to this and, with appropriate particles, the force field could be of another form, e.g. magnetic or electrostatic. Also, the fluid employed can be any of a wide range of liquids and gases.

We claim:
1. A method of on-stream measurement of particle size distribution in a suspension, comprising the steps of:
   causing the suspension to flow in a stream along a channel,
   applying a force field to create a transient specific concentration profile across the channel in which the stream flows, and
   measuring the varying concentration of said profile.

2. A method according to claim 1, wherein the force field is created by causing the stream to flow in a path of changing direction thereby imparting to it an angular velocity.

3. A method according to claim 2, wherein the flowing stream is investigated by radiation absorption detection means, at a position downstream of the region of application of the force field, to determine the concentration distribution in a direction substantially at right angles to the local direction of stream flow and in the general plane of application of the force field.

4. A method of on-stream measurement of particle size distribution for particles the bulk of which are of substantially similar shape and uniform density and suspended in a fluid stream, comprising the steps of applying to the fluid stream containing the particles, while it is flowing in an enclosed channel, a force field in a direction substantially at right angles to the direction of flow to create a particle stratification profile across the flow channel, and measuring the varying concentration of the particles across the flow channel at a region downstream of the region where the force field is applied but before the particle stratification effect is lost due to remixing.

5. Apparatus for on-stream measurement of particle size distribution in a suspension, comprising a flow channel for the suspension, means at one region of the flow channel for locally imparting to the suspended particles in the stream therein a force field in a direction transverse to the principal direction of flow to create a stratification profile across the the flow channel, and detector means downstream of said region, at a station where the stratification effect in the suspension stream is still maintained, to determine the concentration distribution of the particles across the flow channel in the general plane of application of the force field.

6. Apparatus according to claim 5, wherein the means for imparting the force field comprises at least one helical turn in the flow channel, which is otherwise straight.

7. Apparatus according to claim 5, wherein the detector means comprises a radiation source projecting at least one narrow beam of radiation through the flow channel in a direction substantially at right angles to both the local direction of stream flow and the general plane of application of the force field, and radiation detection means on the opposite side of the flow channel to generate an electrical output signal dependent on the amount of radiation passing through.

8. Apparatus according to claim 7, wherein one narrow beam is employed which is scanned across the flow channel in a direction generally parallel to the plane of application of the force field.

References Cited

UNITED STATES PATENTS 3,239,753 3/1966 Arnold _____ 250—105 X
3,070,692 12/1962 Ohmart et al.
3,160,745 12/1964 Foster.

ARCHIE R. BORCHELT, Primary Examiner

U.S. Cl. X.R.

250—105